UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PREPARATION SUITABLE FOR THE INDIGO-VAT.

1,005,481.  Specification of Letters Patent.  Patented Oct. 10, 1911.

No Drawing.  Application filed July 18, 1911.  Serial No. 639,088.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Preparations Suitable for the Indigo-Vat, of which the following is a specification.

In U. S. patent applications Ser. No. 576,703 filed 11th August 1910 and Ser. No. 577,200, filed 15th August 1910 it has been stated that indigo of extremely fine division is obtained by oxidating indigo-leuco compounds solutions of indoxyl or indigo-white in presence of aromatic sulfonic acids or carboxylic acids, for instance those which contain the benzyl residue. Now, I have found that this invention can be utilized for the manufacture of preparations of indigo-white or of salts of indigo-white such as are also particularly suitable for the cold vat, for instance especially for the so-called cold sugar- or fermentation-vat; the characteristic points of this invention being as follows: The indigo-white preparations as they are, for instance, manufactured particularly for Eastern countries in the form of indigo-white or alkali-carbohydrate preparations of indigo-white of high percentage (see U. S. Patent No. 906,307) possesses several advantages over the indigo preparations already on the market, the most remarkable being that it is not necessary for the dyer to subject the material to a reducing process which, apart from being expensive for a small concern, is very much dependent as regards it success on the more or less fine subdivision of the indigo. Now, while employing such preparations in the vat and during the working of the vat there is occasion for a partial re-oxidation of the indigo-white in the vat into indigo. Furthermore, if one examines such an indigo, which may be produced either from carbohydrate solution of indigo-white or from an organic vat or simply from an alkali solution of indigo-white by extracting it with air, it is found that the indigo has separated in very coarse crystals which cannot at all be easily attacked. Thus a long time is required until a small test quantity of indigo separated and filtered in the above-mentioned manner, and put and divided in a test-tube with about 10 ccm. of freshly-prepared mixture of equal parts of a 5 per cent. solution of glucose and a 2 per cent. solution of NaHO solution, yields, when standing, a yellow solution without any essential sediment. Therefore the immediate reduction of the indigo formed by re-oxidation during the working of the vat is not always secured. However, if an indigo-white or an indigo-white alkali preparation is mixed with one of the bodies named in the said patent-applications Ser. No. 576,703, and Ser. No. 577,200, for instance with a benzylanilinesulfonate, it is found that the indigo which may form during the working of the vat is in such a finely-divided *i. e.* colloid-like form that an extremely quick reduction takes place. Thus suitable preparations are, for instance, obtained by adding to the indigo-white, or indigo-white alkali, or a preparation containing a saccharine substance, as described in U. S. Patent No. 906,307, a salt of benzylsulfanilic acid, or by introducing the salt during the manufacture of the indigo-white preparations; thus for instance when using 5%, 10% or 15% of the salt of benzylsulfanilic acid proportionately to the indigo-white in the manufacture of the preparations described in U. S. Patent 906,307.

Having now described my invention, what I claim is:

As new products, the indigo-white preparations particularly suitable for vats, which are capable of causing the indigo forming in case of re-oxidation during the working of the vat to separate in an extremely finely subdivided and therefore very quickly reducible form, said preparations being readily soluble in diluted alkalis and consisting of a portion, which after acidulation with diluted acids is insoluble in hot water showing the reactions characteristic for indigo-white, and of a portion, which after acidulation with diluted acids is more readily soluble in hot water showing the reactions characteristic for a benzylaniline-sulfonic acid.

In testimony whereof, I affix my signature in presence of two witnesses.

ALBRECHT SCHMIDT.

Witnesses:
JEAN GRUND,
CARL GRUND.